(12) United States Patent
Hammersberg et al.

(10) Patent No.: US 11,900,715 B2
(45) Date of Patent: Feb. 13, 2024

(54) SPOOF DETECTION BASED ON SPECULAR AND DIFFUSE REFLECTIONS

(71) Applicant: Fingerprint Cards Anacatum IP AB, Gothenburg (SE)

(72) Inventors: Johan Hammersberg, Floda (SE); Eric Setterberg, Västra Frölunda (SE); Mattias Carlén, Gothenburg (SE); Su Liu, Alingsås (SE)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 0 days.

(21) Appl. No.: 17/917,806

(22) PCT Filed: Mar. 29, 2021

(86) PCT No.: PCT/SE2021/050281
§ 371 (c)(1),
(2) Date: Oct. 7, 2022

(87) PCT Pub. No.: WO2021/211031
PCT Pub. Date: Oct. 21, 2021

(65) Prior Publication Data
US 2023/0137785 A1    May 4, 2023

(30) Foreign Application Priority Data

Apr. 15, 2020 (SE) .................................... 2050427-0
May 19, 2020 (SE) .................................... 2050585-5

(51) Int. Cl.
*G06V 40/13*    (2022.01)
*G06V 10/145*    (2022.01)
(Continued)

(52) U.S. Cl.
CPC .......... *G06V 40/1318* (2022.01); *G06F 21/32* (2013.01); *G06V 10/145* (2022.01);
(Continued)

(58) Field of Classification Search
CPC ............ G06V 40/1318; G06V 10/145; G06V 10/147; G06V 10/56; G06V 10/82;
(Continued)

(56) References Cited

U.S. PATENT DOCUMENTS

2007/0285541 A1* 12/2007 Nakashiba ............. H04N 25/13
348/E9.01
2011/0064282 A1    3/2011 Abramovich et al.
(Continued)

FOREIGN PATENT DOCUMENTS

CN    210091193 U    2/2020

OTHER PUBLICATIONS

U.S. Appl. No. 17/917,780, filed Oct. 7, 2022, Hammersberg et al.
(Continued)

*Primary Examiner* — Premal R Patel
(74) *Attorney, Agent, or Firm* — RMCK Law Group, PLC

(57) ABSTRACT

The present invention relates biometric authentication using an optical biometric arrangement comprising an image sensor comprising a photodetector pixel array configured to capture an image of an object, the image sensor being arranged under a controllable light source comprising light source units, the method comprising: providing a light pattern comprising portions of different light intensity for illuminating the object; acquiring an image of the object, the image comprising image portions corresponding to the portions of different light intensity of the light pattern illuminating the object, at least one image portion being captured by pixels in he photodetector pixel array arranged directly under a light source unit being active during image acquisition, and at least one image portion being captured by pixels in the photodetector pixel array arranged under an at least partly in-active illumination area of the controllable
(Continued)

light source during image acquisition, performing biometric authentication at least partly based on metrics extracted from the image portions.

20 Claims, 11 Drawing Sheets

(51) Int. Cl.
| | |
|---|---|
| G06V 40/12 | (2022.01) |
| G06V 10/56 | (2022.01) |
| G06V 10/82 | (2022.01) |
| G06V 10/147 | (2022.01) |
| G06V 40/40 | (2022.01) |
| G06F 21/32 | (2013.01) |

(52) U.S. Cl.
CPC ............ *G06V 10/147* (2022.01); *G06V 10/56* (2022.01); *G06V 10/82* (2022.01); *G06V 40/1365* (2022.01); *G06V 40/1388* (2022.01); *G06V 40/1394* (2022.01); *G06V 40/45* (2022.01)

(58) Field of Classification Search
CPC ........... G06V 40/1365; G06V 40/1388; G06V 40/1394; G06V 40/45; G06F 21/32; H10K 59/65
See application file for complete search history.

(56) References Cited

U.S. PATENT DOCUMENTS

| | | | |
|---|---|---|---|
| 2013/0136327 | A1 | 5/2013 | Kamei |
| 2018/0129858 | A1 | 5/2018 | Russo |
| 2018/0158877 | A1 | 6/2018 | Zeng et al. |
| 2018/0268232 | A1* | 9/2018 | Kim .................. G06V 40/1382 |
| 2018/0357461 | A1 | 12/2018 | Beaudet |
| 2019/0034020 | A1 | 1/2019 | He et al. |
| 2019/0050618 | A1 | 2/2019 | Khuri-Yakub et al. |
| 2019/0102598 | A1 | 4/2019 | Jiang |
| 2019/0362120 | A1 | 11/2019 | Yazdandoost et al. |
| 2020/0050818 | A1 | 2/2020 | He et al. |
| 2020/0387686 | A1* | 12/2020 | Jhang ................... G06F 3/0421 |
| 2021/0004562 | A1* | 1/2021 | Chiang ................ G06F 3/0421 |
| 2021/0174105 | A1 | 6/2021 | He et al. |

OTHER PUBLICATIONS

PCT International Search Report and Written Opinion dated May 18, 2021 for International Application No. PCT/ SE2021/050281, 13 pages.
PCT International Search Report and Written Opinion dated May 5, 2021 for International Application No. PCT/ SE2021/050280, 12 pages.
Extended European Search Report dated Sep. 12, 2023 for EP Application No. 21787817.2, 6 pages.
Extended European Search Report dated Sep. 12, 2023 for EP Application No. 21789391.6, 6 pages.

* cited by examiner

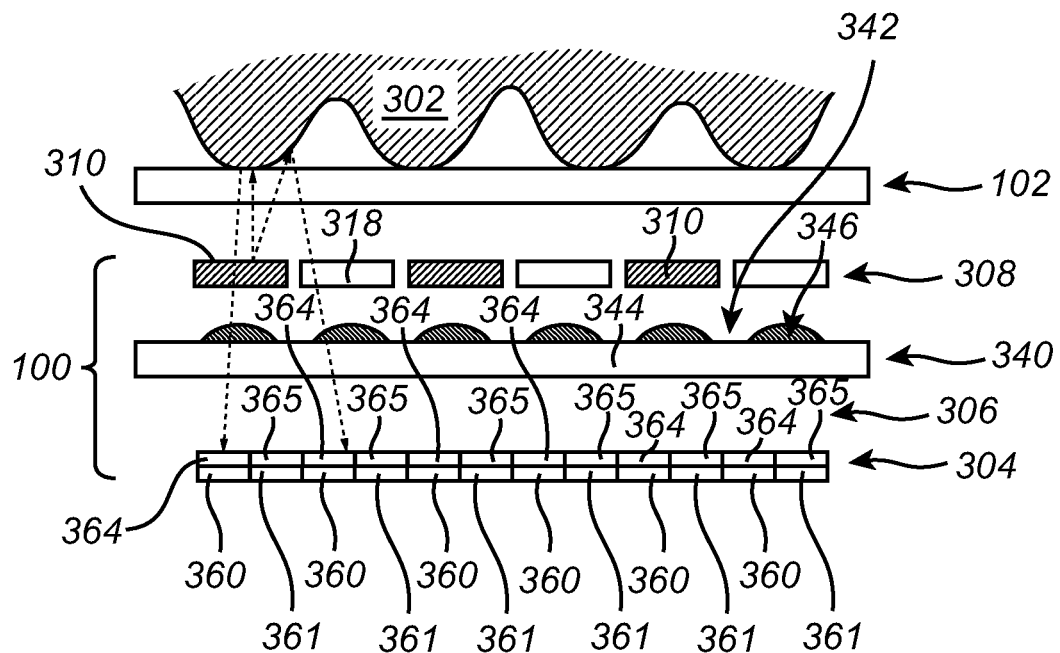
Fig. 6C
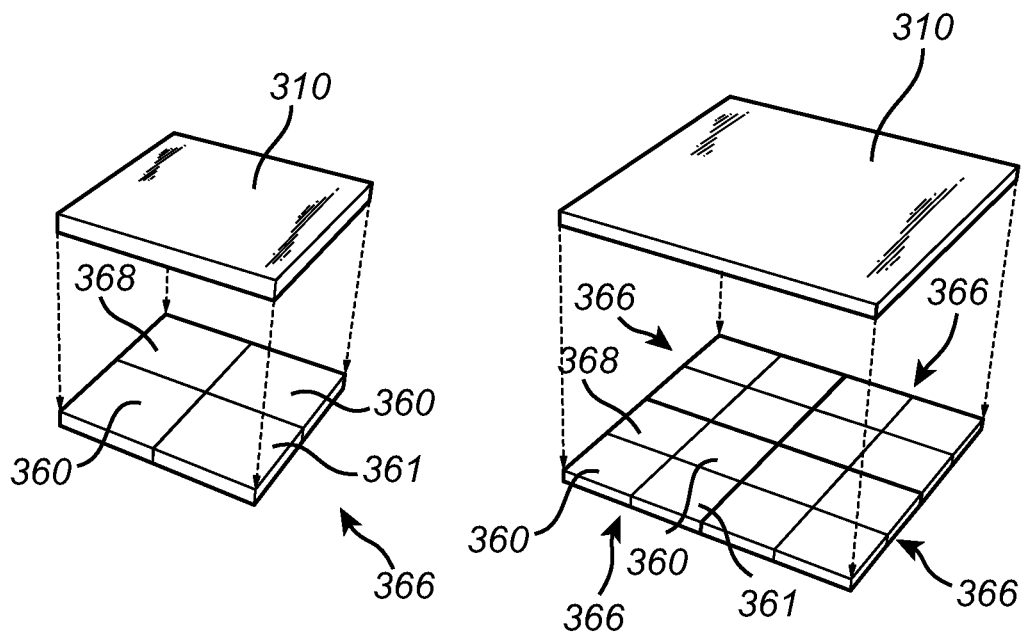
Fig. 6D
Fig. 6E

SPOOF DETECTION BASED ON SPECULAR AND DIFFUSE REFLECTIONS

CROSS-REFERENCE TO RELATED APPLICATIONS

This application is a 371 U.S. National Stage of International Application No. PCT/SE2021/050281, filed Mar. 29, 2021, which claims priority to Swedish Patent Application Nos. 2050427-0, filed Apr. 15, 2020 and 2050585-5, filed May 19, 2020. The disclosures of each of the above applications are incorporated herein by reference in their entirety.

FIELD OF THE INVENTION

The present invention relates to a method for biometric authentication using an optical biometric arrangement, to an optical biometric imaging arrangement, to an electronic device comprising an optical biometric imaging arrangement, to a control unit, and to a computer program product.

BACKGROUND

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

It has recently been of interest to arrange optical fingerprint sensors under the display of electronic devices. However, it turns out that optical fingerprint sensors are sometimes relatively easy to spoof. In some cases, if countermeasures are not applied a piece of paper with a printed fingerprint on it has proven enough to spoof the system.

Accordingly, there is a need for improving the reliability of the spoof detection methodology for optical fingerprint sensors.

SUMMARY

In view of above-mentioned and other drawbacks of the prior art, it is an object of the present invention to provide a method and an optical biometric imaging arrangement with improved capability to detect spoofs.

According to a first aspect of the invention, there is provided a method for biometric authentication using an optical biometric arrangement comprising an image sensor comprising a photodetector pixel array configured to capture an image of an object, the image sensor being arranged under a controllable light source comprising light source units.

The method comprising providing a light pattern comprising portions of different light intensity for illuminating the object, acquiring an image of the object, the image comprising image portions corresponding to the portions of different light intensity of the light pattern illuminating the object, at least one image portion being captured by pixels in the photodetector pixel array arranged directly under a light source unit being active during image acquisition, and at least one image portion being captured by pixels in the photodetector pixel array arranged under a at least partly in-active illumination area of the controllable light source during image acquisition, and performing biometric authentication at least partly based on metrics extracted from the image portions.

The present invention is based on the realization that two-dimensional spoofs only appear under diffuse illumination, and that three-dimensional spoofs are generally distinguishable from live fingers in specularity and color. Accordingly, by studying image portions captured under different illumination, i.e. specular or diffuse illumination, it is possible to distinguish spoofs from live fingers. This was realized by the inventors who propose to form metrics that are indicative of properties in the different image portions. The metrics reflect image properties that may indicate the presence of a spoof or a live finger. The metrics are used in the biometric authentication of the user. Specularity is the visual appearance of specular reflections from the object being imaged.

A metric is a measure or property that is extractable from an image portion and that may in some way describe optical properties. In image portions captured by pixels in the photodetector pixel array arranged directly under a light source unit, the image is dominated by specular reflections from the object, originating from the light source unit above the pixels capturing the image portion. Metric determined from such an image portion may therefore relate to specular properties of the object. Image portions captured by pixels in the photodetector pixel array arranged under an at least partly in-active illumination area of the controllable light source are dominated by diffuse reflections from the object originating from light source units adjacent to the at least partly in-active illumination area.

Generally, in specular reflection the incident angle of the light is equal to the output angle, whereas in diffuse reflection the light is reflected in a range of angles.

An at least partly in-active illumination area may be part of the controllable light source arranged over the photodetector pixel array. The at least partly in-active illumination area does not emit light for image acquisition. The at least partly in-active illumination area may be light source units that are in-active or it may be a through hole or transparent part of the controllable light source.

The light pattern may be provided in various forms, with the requirement that it provides light in a pattern which has different intensity. The light pattern may include distinct portions of high intensity and low intensity, or even no intensity. For example, the light pattern may be structured light.

The light pattern may advantageously be provided from spatially separated light source units in the controllable light source. In other words, the light source units that provides the light for illumination may be separated, either individually or in groups, by areas from which no illumination is provided.

The spatially separated light source units may be arranged in a periodic pattern. However, it is also conceivable that the light source units are arranged in a non-periodic pattern.

The controllable light source may be a color controllable light source.

In embodiments, the light pattern may include light of at least two distinguishable colors. For this, the controllable light source is a color controllable light source. For example, a first set of light source units provides light of a first distinguishable color and a set of light source units provides light of a second distinguishable color for illuminating the object.

Light of a distinguishable color is meant to be light that has spectral band that is a sub-band of the visible wavelength range of light, i.e. light of a distinguishable color is not white light which generally is a mix of all colors. As should be understood, light of a distinguishable color should be separately detectable from light of another distinguishable color.

In other embodiments, acquiring an image may comprise acquiring at least one image portion using photodetector pixels configured to capture light of a first distinguishable color, and at least one image portion using photodetector pixels configured to capture light of a second distinguishable color. Thus, instead of illuminating the object with different distinguishable colors, the color selectivity is performed at the image sensor. Hereby, it is advantageously possible to illuminate the object with broad band illumination. For this embodiment, a first group of pixels and a second group of pixels may be configured to detect light of selected e.g. a predetermined wavelength band related to the respective distinguishable color. This may be achieved by appropriate filters on the pixels such as color filters having a suitable wavelength transmission band, interference filters and Bragg filters may also be conceivable options. Thus, a first set of photodetector pixels may be covered by a first filter and a second set of photodetector pixels may be covered by a second filter, where the spectral transmission band of the filters are different from each other. The first filter may have a spectral transmission band that allows transmission of light of the first distinguishable color and the second filter may have a spectral transmission band that allows transmission of light of the second distinguishable color. There may further be a third set of photodetector pixels covered by a third filter different from the first and second filter, i.e. having spectral transmission band that allows transmission of light of a third distinguishable color.

Broadband illumination means light of multispectral composition, e.g. white light. Broadband illumination may be provided by a light source unit producing broadband illumination light as such, or by a set of light sources cooperatively producing broadband illumination light. Such set of light source unit may for example comprise light sources of different colors simultaneously emitting light to produce broadband illumination light.

In embodiments, any one pixel configured to capture light of the first distinguishable color or any one pixel configured to capture light of the second distinguishable color may be arranged directly under a light source unit being active during image acquisition.

In embodiments, any one pixel configured to capture light of the first distinguishable color or any one pixel configured to capture light of the second distinguishable color may be may be arranged under an at least partly in-active illumination area of the controllable light source during image acquisition.

With the image sensor being configured to selectively detect colored light, the method may comprise illuminating the object with broad band illumination.

The above advantageously allows for including illumination color information in the metrics. As mentioned, the inventors realized that spoofs generally have different optical behavior compared to live fingers under illumination with colored light. Therefore, forming metrics based on color information further improves the performance of the biometric authentication.

To further improve the performance, the biometric authentication may at least partly be based on metrics extracted from the image portions for each of the at least two distinguishable colors. In other words, the dimensionality of the metrics is extended to include each of the at least two distinguishable colors.

The distinguishable colors may be blue and green light, in addition to white light that may be used for illumination of the finger.

In embodiments, the metrics are extracted based on histogram analysis of image portions. For example, a histogram of a first type of image portion related to pixels directly under a light source units may be analyzed to extract metrics, and a histogram of a second type of image portion related to pixels not directly under an active light source units may be analyzed to extract metrics. Histogram analysis provides a powerful tool for forming metrics that capture overall properties of the image portions.

Preferably, at least one image portion corresponds to predominantly specular light reflected off the object, and at least one image portion corresponds to predominantly diffuse light reflected off the object.

For this, the photodetector pixel array may comprise pixels arranged to capture predominantly specular light reflected off the object and pixels arranged to capture predominantly diffuse light reflected off the object.

In embodiments, the method may comprise pre-processing the acquired image for forming metrics based on properties in the image portions. The pre-processing step may be used for classifying the object into one of several categories related to structure and optical properties, such as for example whether the object comprises three-dimensional structures or if the object is two-dimensional object, and/or color properties of the object.

In embodiments, the light pattern may be a dot pattern, wherein a first group of image portions are acquired by pixels direct under the dots, and a second group of image portions are acquired by pixels under and between the dots. A dot pattern is one advantageous way to separate specular and diffused light reflections of the object that homogenous light illumination normally intermixes.

In embodiments, the biometric authentication may be based on processing the metrics using a model. A model may be provided in various forms and configurations, such as simple look-up table models and more involved mathematical models describing metrics and their relationships to spoofs materials and live materials. In preferred embodiment, a model may be a machine learning algorithm trained on these metrics to distinguish between spoofs and live biometric objects.

In other words, preferably, the biometric authentication is based on processing the metrics using a machine learning algorithm.

A machine learning algorithm according to embodiments herein may be based on different types of machine learning algorithms known per se. The machine learning algorithm may be trained based on e.g. supervised learning, unsupervised learning, reinforcement learning, etc. The machine learning algorithm is based on a model such as a support vector machine, an artificial neural network e.g. deep learning networks or multilayer perceptron, regression analysis, etc.

According to a second aspect of the invention, there is provided an optical biometric imaging arrangement configured to capture an image of an object, the biometric imaging arrangement comprising: an image sensor comprising a photodetector pixel array, the image sensor being arranged under a controllable light source comprising light source units, wherein the photodetector pixel array comprises a first set of pixels to acquire a first type of image portion, pixels of the first set of pixels being arranged directly under a light source unit of the controllable light source that is active during image acquisition, and a second set of pixels to acquire a second type of image portion, pixels of the second set of pixels being arranged directly under a portion of the controllable light source that is at least partly in-active during image acquisition, the optical biometric imaging arrangement being configured to: illuminate the object with a light pattern comprising portions of different light intensity using the controllable light source; acquire an image of the object, the image comprising image portions of the first type and of the second type corresponding to the portions of different light intensity of the light pattern illuminating the object, perform biometric authentication at least partly based on metrics extracted from the image portions.

The image sensor may be any suitable type of image sensor, such as a CMOS or CCD sensor connected to associated control circuitry. In one possible implementation the image sensor is a thin-film transistor (TFT) based image sensor which provides a cost-efficient solution for under display fingerprint imaging sensors. The operation and control of such image sensors can be assumed to be known and will not be discussed herein. The TFT image sensor may be a back illuminated TFT image sensor or a front illuminated TFT image sensor. The TFT image sensor may be arranged as a Hot-zone, Large Area or Full display solution.

The optical biometric imaging arrangement may comprise an array a light redirecting element configured to redirect light onto a subarray of pixels in the photodetector pixel array.

The array of light redirecting elements may be an array of microlenses. Microlenses provide an advantageous way to redirect light onto the photodetector pixel array. In particular, each is microlens may be arranged to redirect light onto a subarray of pixels.

The first type of image is an image portion corresponding to predominantly specular light reflected off the object, and the second type of image is an image portion corresponding to predominantly diffuse light reflected off the object.

Preferably, the metrics may be determined based on the first type of image portion and the second type of image portion.

The optical biometric imaging arrangement may comprise a color controllable light source.

In other possible embodiments, the color controllable light source may be comprised in an electronic device comprising an at least partly transparent display panel.

In some embodiments, the color controllable light source may be included in a display. Various types of displays can be used in accordance with embodiments. For example, display panels based on OLED, u-LED with any type of tri-stimulus emission like RGB, CMY or others.

The light pattern may be structured light of a predetermined pattern.

In preferred embodiments, the optical biometric imaging arrangement may be configured to operate a machine learning algorithm for performing biometric authentication at least partly based on the metrics extracted from the image portions.

In embodiments, the image sensor may comprise least a first group of photodetector pixels configured to capture light of a first distinguishable color, and at least a second group of photodetector pixels configured to capture light of a second distinguishable color.

Further effects and features of the second aspect of the invention are largely analogous to those described above in connection with the first aspect of the invention.

According to a third aspect of the invention, there is provided an electronic device comprising an optical biometric imaging arrangement according to any one of the embodiments herein, and processing circuitry configured to: receive a signal from the optical biometric imaging arrangement indicative of a fingerprint of a finger touching the transparent display panel, perform a fingerprint authentication procedure based on the detected fingerprint.

The electronic device may be e.g. a mobile device such as a mobile phone (e.g. Smart Phone), a tablet, a phablet, etc.

Further effects and features of the third aspect of the invention are largely analogous to those described above in connection with the first aspect and the second aspect of the invention.

According to a fourth aspect of the invention, there is provided a control unit configured to perform biometric authentication using an optical biometric arrangement comprising an image sensor comprising a photodetector pixel array configured to capture an image of an object, the image sensor being arranged under a controllable light source comprising light source units, the control unit being configured to: obtaining an image of the object, the image being acquired while illuminating the object with a light pattern comprising portions of different light intensity, whereby the obtained image comprises image portions corresponding to the portions of different light intensity of the light pattern illuminating the object, at least one image portion being captured by pixels in the photodetector pixel array arranged directly under a light source unit being active during image acquisition, and at least one image portion being captured by pixels in the photodetector pixel array arranged under a at least partly in-active illumination area of the controllable light source during image acquisition and performing biometric authentication at least partly based on metrics extracted from the image portions.

In embodiments, the control unit may be configured to control the controllable light source to illuminate the object with the light pattern, and to control an image sensor of the optical biometric arrangement to acquire the image of the object.

Further effects and features of the fourth aspect of the invention are largely analogous to those described above in connection with the first aspect the second aspect, and the third aspect of the invention.

According to a fifth aspect of the invention, there is provided a computer program product comprising a computer readable medium having stored thereon computer program means for performing biometric authentication of a user of an electronic device including an optical biometric imaging arrangement, wherein the computer program product comprises: code for determining a set of metrics from image portions of an acquired image of an object, the image being acquired while illuminating the object with a light pattern comprising portions of different light intensity using a controllable light source comprising light source units, whereby the obtained image comprises image portions corresponding to the portions of different light intensity of the light pattern illuminating the object, at least one image portion being captured by pixels in the photodetector pixel array arranged directly under a light source unit being active during image acquisition, and at least one image portion being captured by pixels in a photodetector pixel array arranged under a at least partly in-active illumination area of the controllable light source during image acquisition, and code for performing biometric authentication at least partly based on metrics extracted from the image portions.

The computer readable medium may be a non-transitory computer readable medium.

Further effects and features of the fifth aspect of the invention are largely analogous to those described above in connection with the first aspect the second aspect, the third aspect, and the fourth aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIG. 6C schematically illustrates an optical biometric imaging arrangement according to embodiments of the invention;

FIG. 6D conceptually illustrates a light source unit covering a unit cell of pixels;

FIG. 6E conceptually illustrates a light source unit covering several unit cells of pixels;

DETAILED DESCRIPTION OF EXAMPLE EMBODIMENTS

In the present detailed description, various embodiments of the optical biometric imaging arrangement according to the present invention are mainly described with reference to an optical biometric imaging arrangement arranged under a display panel. However, it should be noted that the described imaging device also may be used in other optical biometric imaging applications such as in an optical fingerprint sensor located under a cover glass or the like.

Figure 1:
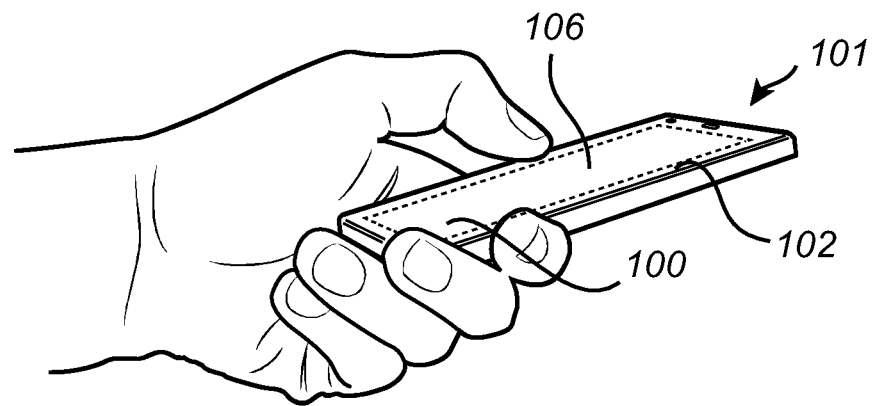
FIG. 1 schematically illustrates an example of an electronic device according to embodiments of the invention.

Turning now to the drawings and in particular to FIG. 1, there is schematically illustrated an example of an electronic device configured to apply the concept according to the present disclosure, in the form of a mobile device 101 with an integrated in-display optical biometric imaging arrangement 100 and a display panel 102 with a touch screen interface 106. The optical biometric imaging arrangement 100 may, for example, be used for unlocking the mobile device 101 and/or for authorizing transactions carried out using the mobile device 101, etc.

The optical biometric imaging arrangement 100 is here shown to be smaller than the display panel 102, but still relatively large, e.g. a large area implementation. In another advantageous implementation the optical biometric imaging arrangement 100 may be the same size as the display panel 102, i.e. a full display solution. Thus, in such case the user may place his/her finger anywhere on the display panel for biometric authentication. The optical biometric imaging arrangement 100 may in other possible implementations be smaller than the depicted optical biometric imaging arrangement, such as providing a hot-zone implementation.

Preferably and as is apparent for the skilled person, the mobile device 100 shown in FIG. 1 may further comprise a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices comprising transparent display panels, such as a laptop, a tablet computer, etc.

Figure 2:
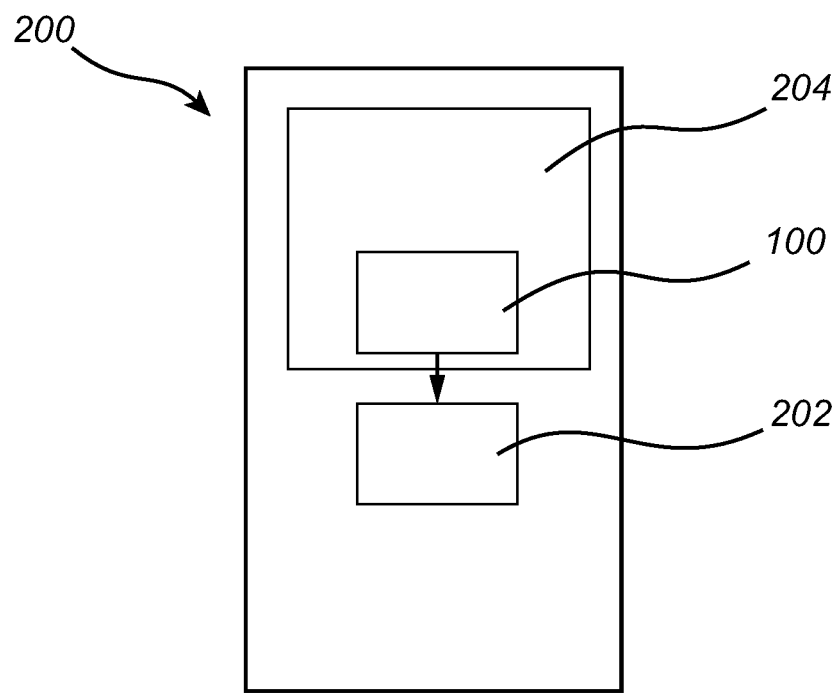
FIG. 2 is a schematic box diagram of an electronic device according to embodiments of the invention.

FIG. 2 is a schematic box diagram of an electronic device according to embodiments of the invention. The electronic device 200 comprises a transparent display panel 204 and an optical biometric imaging arrangement 100 conceptually illustrated to be arranged under the transparent display panel 204 according to embodiments of the invention. Furthermore, the electronic device 200 comprises processing circuitry such as control unit 202. The control unit 202 may be stand-alone control unit of the electronic device 202, e.g. a device controller. Alternatively, the control unit 202 may be comprised in the optical biometric imaging arrangement 100.

The control unit 202 is configured to receive a signal indicative of a detected object from the optical biometric imaging arrangement 100. The received signal may comprise image data.

Based on the received signal the control unit 202 is arranged to detect e.g. a fingerprint. Based on the detected fingerprint the control unit 202 is configured to perform a fingerprint authentication procedure. Such fingerprint authentication procedures are considered per se known to the skilled person and will not be described further herein.

Figure 3:
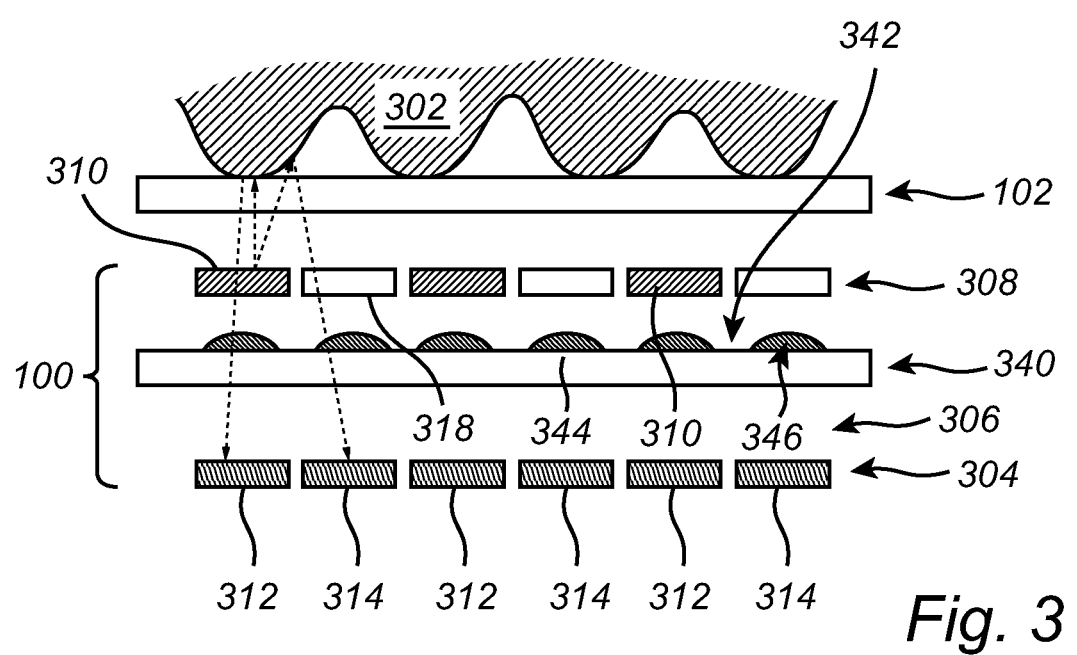
FIG. 3 schematically illustrates an optical biometric imaging arrangement according to embodiments of the invention.

FIG. 3 schematically illustrates an optical biometric imaging arrangement 100 according to embodiments of the invention. The optical biometric imaging arrangement 100 being configured to capture an image of an object 302.

The optical biometric imaging arrangement 100 comprises an image sensor 304 comprising a photodetector pixel array 306. The image sensor 304 is arranged under a controllable light source 308 comprising light source units 310.

The image sensor 304 may be any suitable type of image sensor, such as a CMOS or CCD sensor connected to associated control circuitry. The image sensor 304 may in some implementations be a thin-film transistor (TFT) based image sensor which provides a cost-efficient solution. The operation and control of such an image sensor can be assumed to be known and will not be discussed herein.

There are suitable openings or optical paths past the controllable light source 308 so that the light beams being transmitted from the object 302 can reach the image sensor 304. For example, the controllable light source may be a display with the light sources not being completely dense. In other words, this allows the reflected light from the display and the object to reach the sensor. Light illuminating dots may also be built out of one or several light pixels, leaving intermediate area where the reflected light can reach the image sensor 304.

The photodetector pixel array 306 comprises a first set of pixels 312 to acquire a first type of image portion. The first set of pixels 312 being arranged directly under a light source unit 310 of the color controllable light source that is active during image acquisition.

The photodetector pixel array 306 further comprises a second set of pixels 314 to acquire a second type of image portion. The second set of pixels 314 being arranged directly under a portion 318 of the controllable light source that is at least partly in-active during image acquisition.

Figure 4:
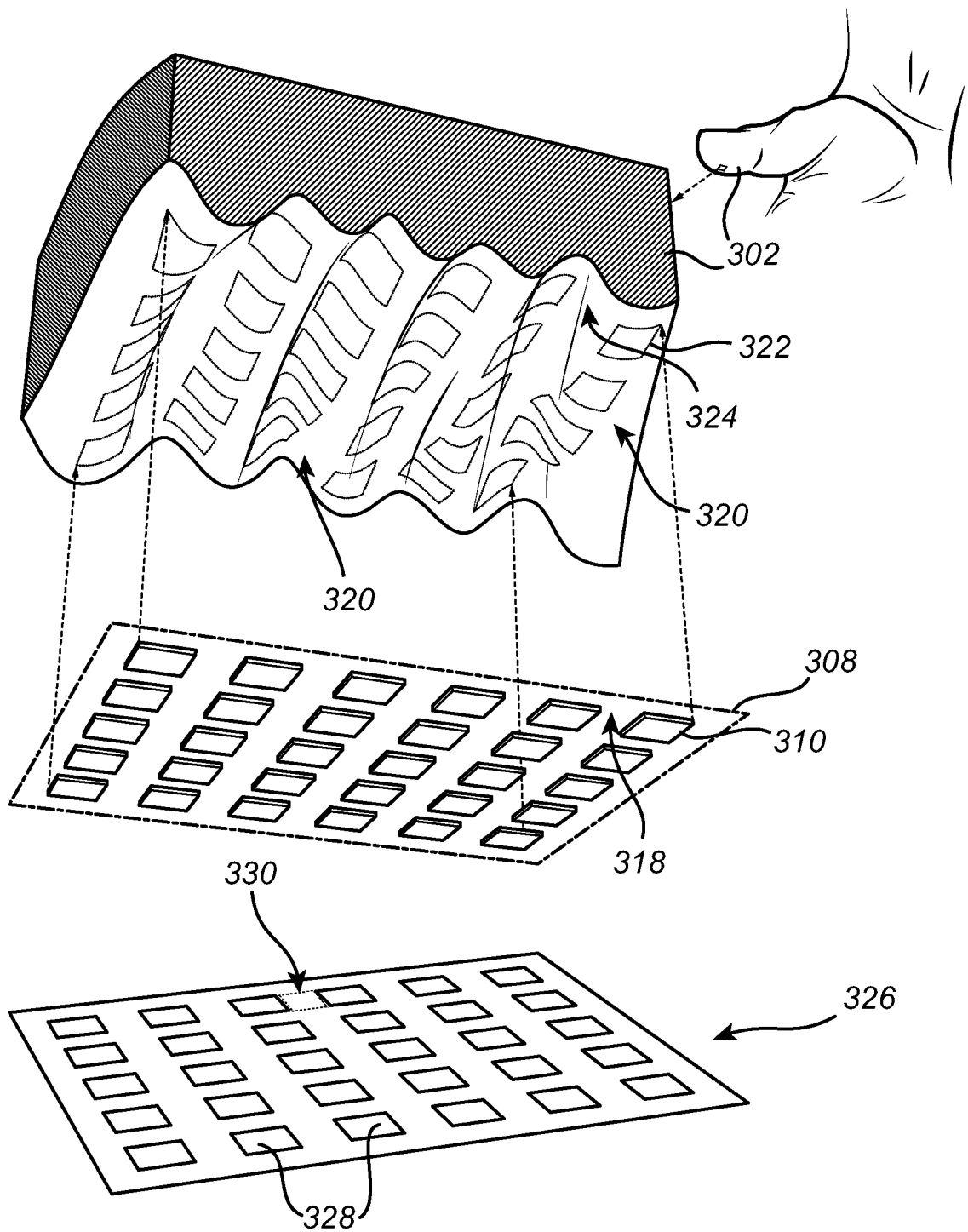
FIG. 4 schematically illustrates an optical biometric imaging arrangement when providing a light pattern and acquiring an image according to embodiments of the invention.

Now referring to FIG. 4 in conjunction with FIG. 3, the optical biometric imaging arrangement 100 is configured to illuminate the object 302 with a light pattern 320 comprising portions of different light intensity using the controllable light source 308. In other words, the controllable light source comprises light source units 310 that cooperate to provide first illumination portions 322 with higher intensity than second illumination portions 324. The light source units 310, or groups of light source units, are separated such that areas 318 between the active light source units 310, are generally in-active, i.e. do not produce illumination.

While illuminating the object 302, the optical biometric imaging arrangement 100 is configured to acquire an image 326 of the object 302. As a result of the object 302 being illuminated with the light pattern 320, the image 326 comprises image portions 328 (only two are provided with numeral signs) of the first type and image portions 330 of the second type corresponding to the portions of different light intensity of the light pattern illuminating the object. The image portions 328 correspond to the illumination portions 322 with higher intensity than second illumination portions 324. The image portions 330 of the second type correspond to the illumination portions 324 with the lower intensity. The image portions 330 (only one is provided with numeral signs) of the second type are located between image portions 328 of the first type.

The pixels in the image sensor 304 that captures the image portions 328 that correspond to the illumination portions 322 with the higher intensity are arranged directly below the respective active light source unit 310.

Similarly, the pixels in the image sensor 304 that captures the image portions 330 that correspond to the illumination portions 324 with the lower intensity are arranged directly below the respective at least partly in-active area 318.

The optical biometric imaging arrangement 100 is configured to perform biometric authentication at least partly based on metrics extracted from the image portions. The metrics may be extracted from image portions of one of the first type and the second type, or from both the first type and the second type.

It is understood that, for clarity in the drawings, the light source units and the pixels of the image sensor are not drawn to scale. Further, a light source unit may comprise several light sources, such as a set of LED or OLED pixels that together form a light source unit. For example, a set of 3×3 LED or OLED pixels may form a light source unit. Further, the size of a light source unit is generally larger than an individual image sensor pixel. Preferably, a unit cell of photodetector pixels comprising at least four pixels are arranged below each light source unit.

Turning again to FIG. 3, the optical biometric imaging arrangement 100 is here arranged under an at least partially transparent display panel 102. However, the optical biometric imaging arrangement 100 may be arranged under any cover structure which is sufficiently transparent, as long as the image sensor receives a sufficient amount of light to capture an image of a biometric object 302 in contact with the outer surface of the cover structure, such as a fingerprint or a palmprint.

The photodetector pixel array preferably comprises pixels 312 arranged to capture predominantly specular light reflected off the object and pixels 314 arranged to capture predominantly diffuse light reflected off the object. The facilitates for capturing an image comprising at least one image portion 328 that corresponds to predominantly specular light reflected off the object 302, and at least one image portion 330 that corresponds to predominantly diffuse light reflected off the object 302.

The spatial relationship between an active light source unit 310 and the pixel 312 directly under the active light source unit 310 provides for the light transmitted from the light source unit reflected off the object 302 and that is detected by the pixel 312, has undergone predominantly specular reflection off the object 302. Similarly, the pixels 314 arranged between the active light source units 310, i.e. under at least partly in-active areas 318, receive light that has diffusively been reflected off the object 302.

Figure 5A:
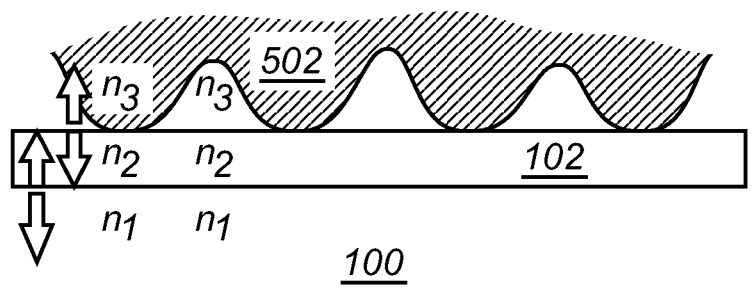
FIG. 5A conceptually illustrates normal incident reflections at different interfaces between a three-dimensional object and a cover structure.

The specular light that is detected by the pixel directly under the light source is further predominantly normal reflected off the object. FIG. 5A conceptually illustrates the normal incident reflections at different interfaces. A first interface is between air having refractive index n1 and a cover structure 102 having refractive index n2 covering the optical biometric imaging arrangement 100. A second interface is between the cover structure 102 and air that fills spaces between the object 502 and the cover structure 102, e.g. at fingerprint valleys. A third interface is between the object with refractive index n3, e.g. at a fingerprint ridge, and the cover structure 102. The specular back reflected light from light source units is dominated by surfaces reflections due to the refractive index miss-match at each interface. In other words, if the object is a three-dimensional object as shown in FIG. 5A, there are different index mismatches, i.e. n2/n3 and n2/n1 at the outer surface of the cover structure 102, and therefore different normal angle specular reflections occur. Thus, if the object is a three-dimensional object, the three-dimensional structure will appear in the image portions 328 captured by pixels directly under the light source units 310.

Figure 5B:
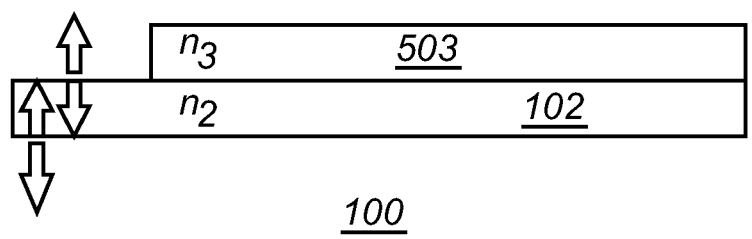
FIG. 5B conceptually illustrates normal incident reflections at an interface between a two-dimensional object and a cover structure.

In contrast, now turning to FIG. 5B, if the object is a two-dimensional object 503, there is only a single interface being between the cover structure 102 having refractive index n2 and the object 503 with refractive index n3. In other words, the normal angle specular reflection will be equal across the entire two-dimensional object and no structure can be detected. Accordingly, a two-dimensional structure can be distinguished from a three-dimensional structure by analyzing the image portions 328 captured by pixels directly under the light source units 310.

Generally, in specular reflection the incident angle of the light is equal to the output angle, whereas in diffuse reflection the light is reflected in a range of angles. Further, diffuse reflection is wavelength dependent since different color wavelength are scattered and absorbed differently depending on the material of the reflecting object. Non-normal specular reflection is at least to first degree the same for all wavelengths. Consequently, color differences will appear better using diffused reflected light. Therefore, the image portions 330 captured by pixels not directly under the active light source units 310 may be analyzed for detecting color differences.

Based on the above, the light pattern may advantageously include light of at least two distinguishable colors. This allows for analyzing color information of the object 302. For example, even if a spoof may be realized with similar three-dimensional structure as a live finger, the color of the reflected light from the object may be different from that of a live finger. In other possible embodiments, the object is illuminated with broadband light, e.g. multispectral light, and the image sensor comprises different groups of pixels that are configured to detect light of specific colors. Thus, the color selectivity may be performed at the image sensor instead of by the controllable light source.

Figure 6A:
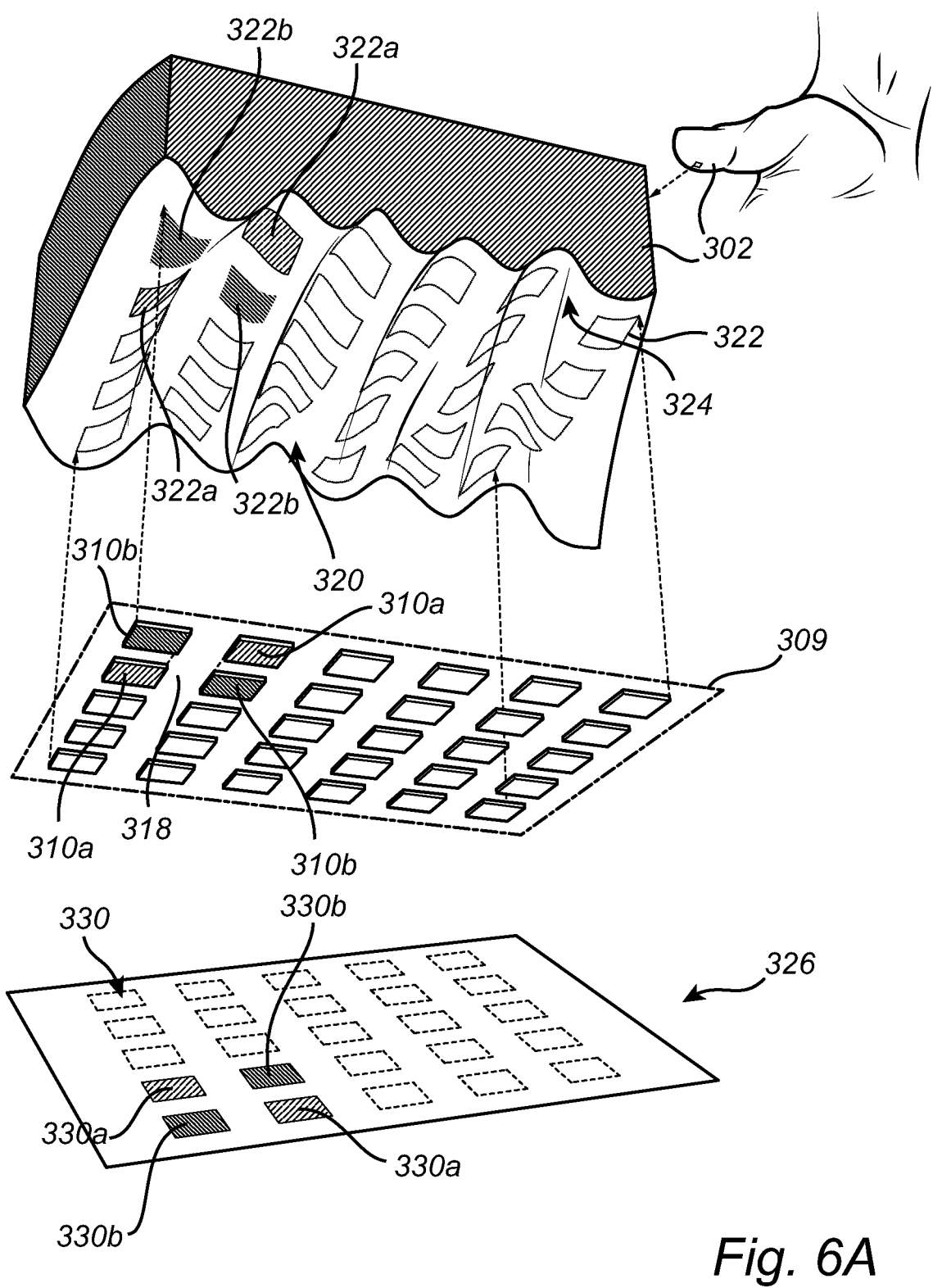
FIG. 6A schematically illustrates an optical biometric imaging arrangement when providing a light pattern and acquiring an image according to embodiments of the invention.

Turning to FIG. 6A conceptually illustrating a color controllable light source 309 comprising a first set of light source units 310a configured to provide light of a first distinguishable color and a second set of light source units 310b configured to provide light of a second distinguishable color for illuminating the object. Thus, the illumination pattern 320 includes portions 322a-b of different illumination color as provided by the corresponding light source units 310a-b. Corresponding image portions 330a,b contain color information, and as mentioned above, the color information is better detected in the image portions 330 captured by pixels not directly under the active light source units 310a-b. Note that only two of light source units 310a and two of the of light source units 310b are shown here, however, in practical implementations, there are more than two of each light source units 310a-b.

The color information extracted from the image portions 330, 330a,b is included in the metrics. In other words, biometric authentication may at least partly be performed based on metrics extracted from the image portions for each of the at least two distinguishable colors. The distinguishable colors may for example be provided from green light and blue light, by e.g. LED or OLED pixels.

Figure 6B:
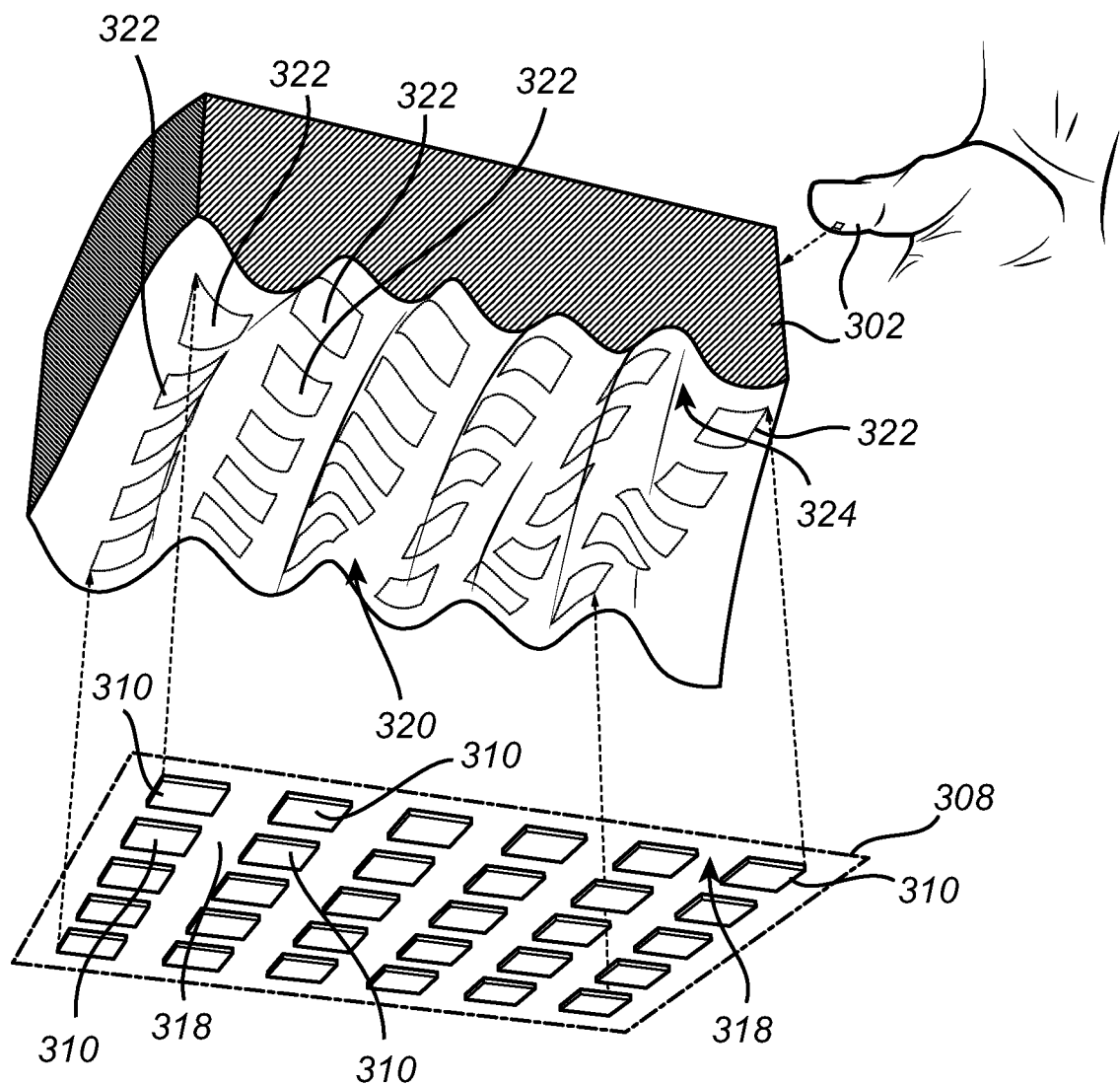
FIG. 6B schematically illustrates an optical biometric imaging arrangement when providing a light pattern and acquiring an image according to embodiments of the invention.
Figure 6B:
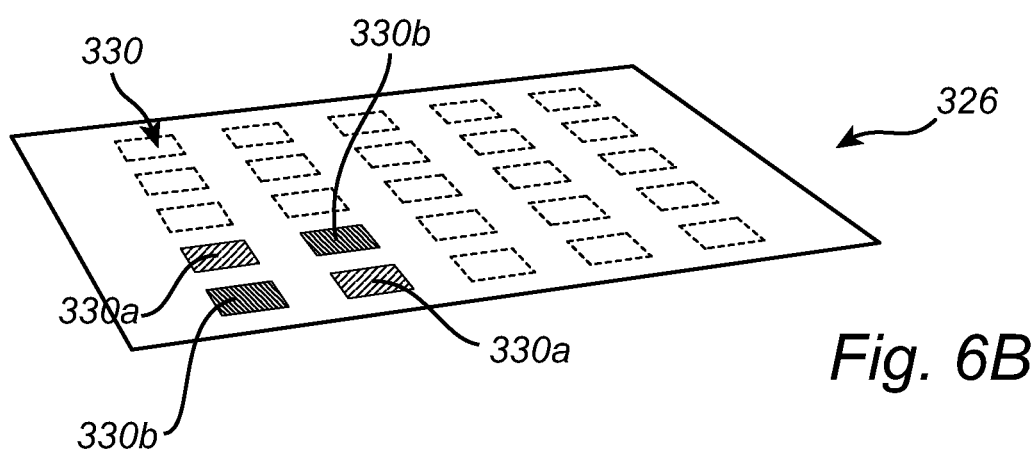

FIG. 6B illustrates another embodiment where the acquired image comprises image portions with color information as in FIG. 6A. However, in this embodiment, the optical biometric imaging arrangement 100 is configured to illuminate the object 302 with a broadband illumination light pattern 320 comprising portions of different light intensity using the controllable light source 308. The broadband illumination is a multispectral illumination covering a range of wavelengths, preferably producing white light. For this, several light source 310 units may cooperatively produce white light, for example, when the controllable light source unit is a display such as an OLED, LED, LCD or similar, several pixels in the display may cooperatively produce broadband illumination. An indicated light source unit 310 may comprise one or multiple display pixels.

With further reference to FIG. 6B, an acquired image 326 comprises at least one image portion 330a acquired using photodetector pixels configured to capture light of a first distinguishable color. Further, the image 326 comprises at least one image portion 330b acquired using photodetector pixels configured to capture light of a second distinguishable color. For this, some of pixels may be configured to detect light of the first distinguishable color, and other pixels may be configured to detect light of a second distinguishable color, while the controllable lights source 308, is configured to produce broadband illumination for illuminating the object 302.

Turning now to FIG. 6C, for selectively detecting light of distinguishable colors, the pixels may be covered by appropriate filters. For example, pixels 360 may be covered by a first filter 364 having a transmission band allowing light of the first distinguishable color to reach the pixels 360. Similarly, pixels 361 may be covered by a second filter 365 having a transmission band allowing light of the second distinguishable color to reach the pixels 361.

As conceptually illustrated in FIG. 6C, any one pixel 360 or any one pixel 361 of pixels may be arranged directly under a light source unit 310 being active during image acquisition. Further, any one pixel 360 or any one pixel 361 may be arranged under an at least partly in-active illumination area 318 of the controllable light source during image acquisition.

Further, the image sensor may comprise pixels configured to detect further distinguishable colors. For example, as conceptually illustrated in FIG. 6D, in a preferred embodiment, a unit cell 366 of pixels comprises at least one pixel 360 configured to capture light of a first distinguishable color, at least one pixel 361 configured to capture light of a second distinguishable color, and at least one pixel 368 configured to capture light of a third distinguishable color that is arranged below each light source unit 310. In this embodiment, there are two pixels 360 configured to capture light of the first distinguishable color arranged below each light source unit 310.

In possible implementations, the pixels 360 may be configured to detect green light, the pixel 361 is configured to detect blue light and the pixel 368 is configured to detect red light, by means of suitable filtering as described above.

Preferably, the light source unit 310 covers several unit cells 366 as conceptually illustrated in FIG. 6E.

Figure 7:
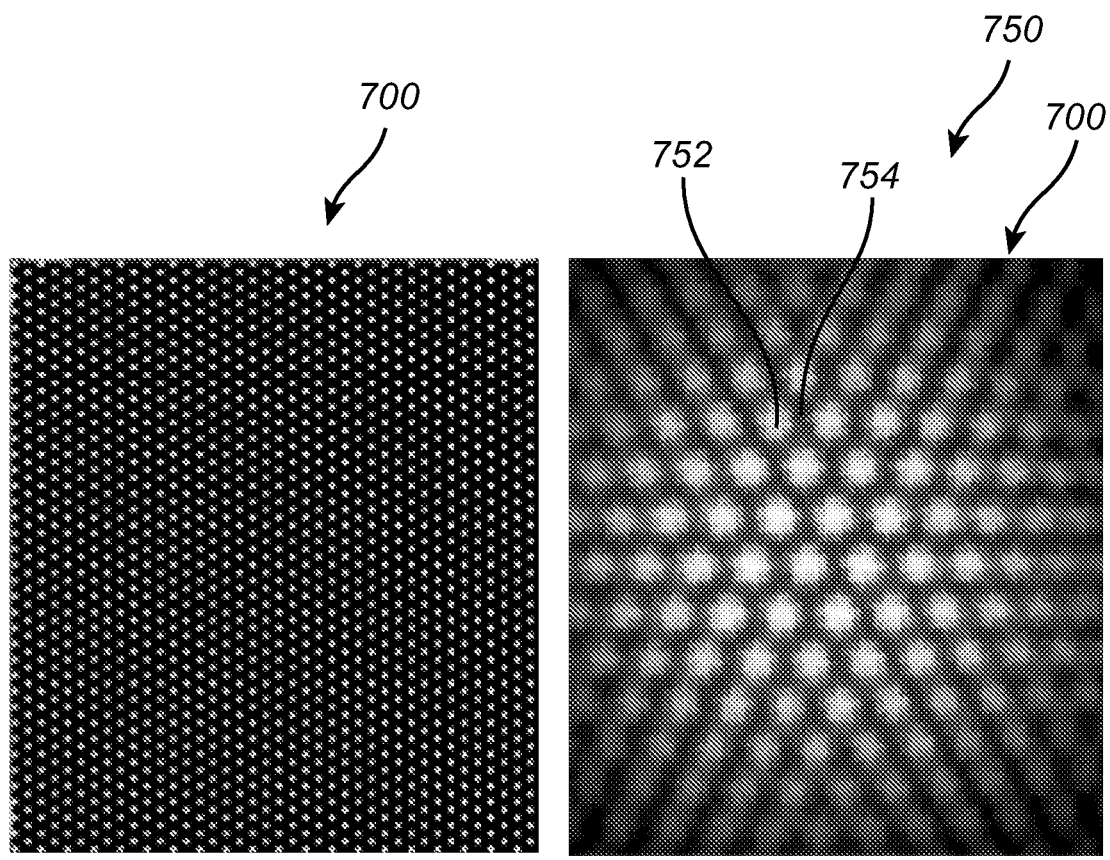
FIG. 7 conceptually illustrates a light pattern in the form of a dot pattern produced by a controllable light source and an acquired image comprising different image portions.

FIG. 7 conceptually illustrates a light pattern 700 being a dot pattern produced by a controllable light source and an acquired image 750 comprising different image portions. Local maxima light values and local minima light values may be collected in from the image 750. A local maximum 752 corresponds to light detected from directly under a dot, e.g. under a light source unit. Thus, a first group of image portions are acquired by pixels direct under the dots, At the local maximum 752 (only one is numbered) the detected signal should mostly be modulated by the three-dimensional structure of the object, as discussed above. In other words, a histogram of the local maxima in the image 750 should be wider if a three-dimensional structure is imaged.

Light from local minima 754 (only one is numbered) correspond to light detected between the dots in the light pattern 700, in other words, a second group of image portions 754 are acquired by pixels under and between the dots. The signal representing the local minima is dominated by diffuse reflected light. Based on the above discussion, color properties of the object should be detectable by studying the local minima 754. In case the optical biometric imaging arrangement is arranged under a display panel, or under any other at least partly reflective surface, the specular and diffusive reflections from the at least partly reflective surface may be compensated for based on normalization procedures using different normalization targets.

The metrics may be extracted based on histogram analysis of the image portions. For example, histograms of signals acquired by pixels arranged under light source units emitting light of a distinguishable color, histograms of pixels configured to capture light of distinguishable colors, histograms of signals acquired by pixels arranged directly under a light source unit emitting light white light, histograms of the maxima and histograms of the minima in a captured image 750.

Extracting metrics may be performed according to various procedures, and for exemplary purposes one example is now discussed. After appropriate calibration of the image intensities using e.g. images of a specular target and a diffuse target, an adjusted image is obtained. Based on this adjusted image, the local maxima are calculated and summed up as a local maxima matrix. A histogram of this local maxima matrix may be calculated. Similarly, the local minima are calculated and summed up as a local minima matrix. The histogram of the local minima matrix is calculated.

Metrics may be extracted or calculated from the histograms. For example, a histogram center portion may be one metric, in other words, a portion of the histogram with values between an upper threshold and a lower threshold, where the thresholds may be tuned. The histogram center portion may be calculated and stored in a metrics structure.

Further, upper and lower percentiles of the histograms may be calculated and stored in the metric structure. Another possible metric is the width of the histograms.

Further, as an example, for the local maxima and/or the local minima a measure of the sum of the histogram bins above a threshold value, e.g. such as a threshold value of 1, may be calculated and stored as a metric in the metrics structure.

In addition, a metric may be related to the total area of the high intensity area below the controllable light source. Thus, the area of the maximum 752, or the image portions 328, where the area is defined by pixels associated with pixel values above a threshold.

Another example metric is to analyze correlations of the local maxima and local minima with a reference image. Such a reference image may be e.g. a calibration image for the optical biometric imaging arrangement. The reference image may also be an image used for normalizing the specular and diffusive reflections from the at least partly reflective surface as described above.

The above procedure of extracting metrics may be repeated for each distinguishable color. In other words, a histogram of a local maxima matrix and a histogram of local minima matrix may be calculated for respective pixels associated with capturing images with illumination of each of the distinguishable colors.

Each metric provides an indication of a property of the object where metrics from histograms based on a local maxima matrix are indicative of 3D structures of the object, and the local minima matrix are indicative of color properties of the object.

Preferably, the biometric authentication is based on processing the metrics using a model. An example model is based on machine learning algorithms. In other words, the biometric authentication is based on processing the metrics using a machine learning algorithm.

An example machine learning algorithm is based on an artificial neural network that may be trained based on e.g. supervised learning or unsupervised learning. An example artificial neural network is the multilayer perceptron model.

Figure 8:
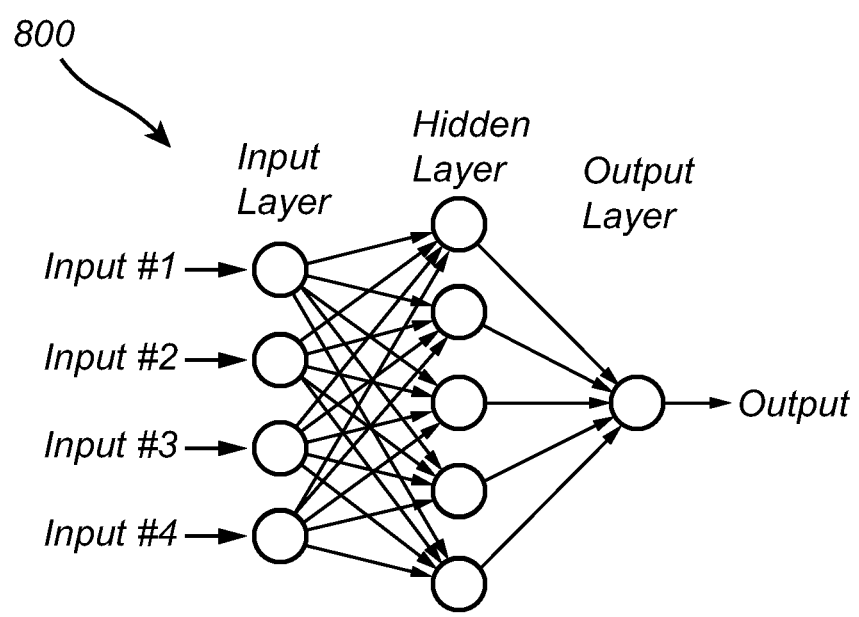
FIG. 8 conceptually illustrates an artificial neural network according to embodiments of the invention.

The multilayer perceptron model 800 is conceptually illustrated in FIG. 8. Here, the multilayer perceptron model 800 is exemplified by having four inputs in an input layer, a hidden layer, and an output in an output layer. The number of inputs and the number of hidden layers may be different from the depicted example. A classifier that uses backpropagation may be used to learn a multi-layer perceptron to classify images. The nodes in this multilayer perceptron model 800 may all be sigmoid.

Other artificial neural networks may also be conceivable.

Figure 9:
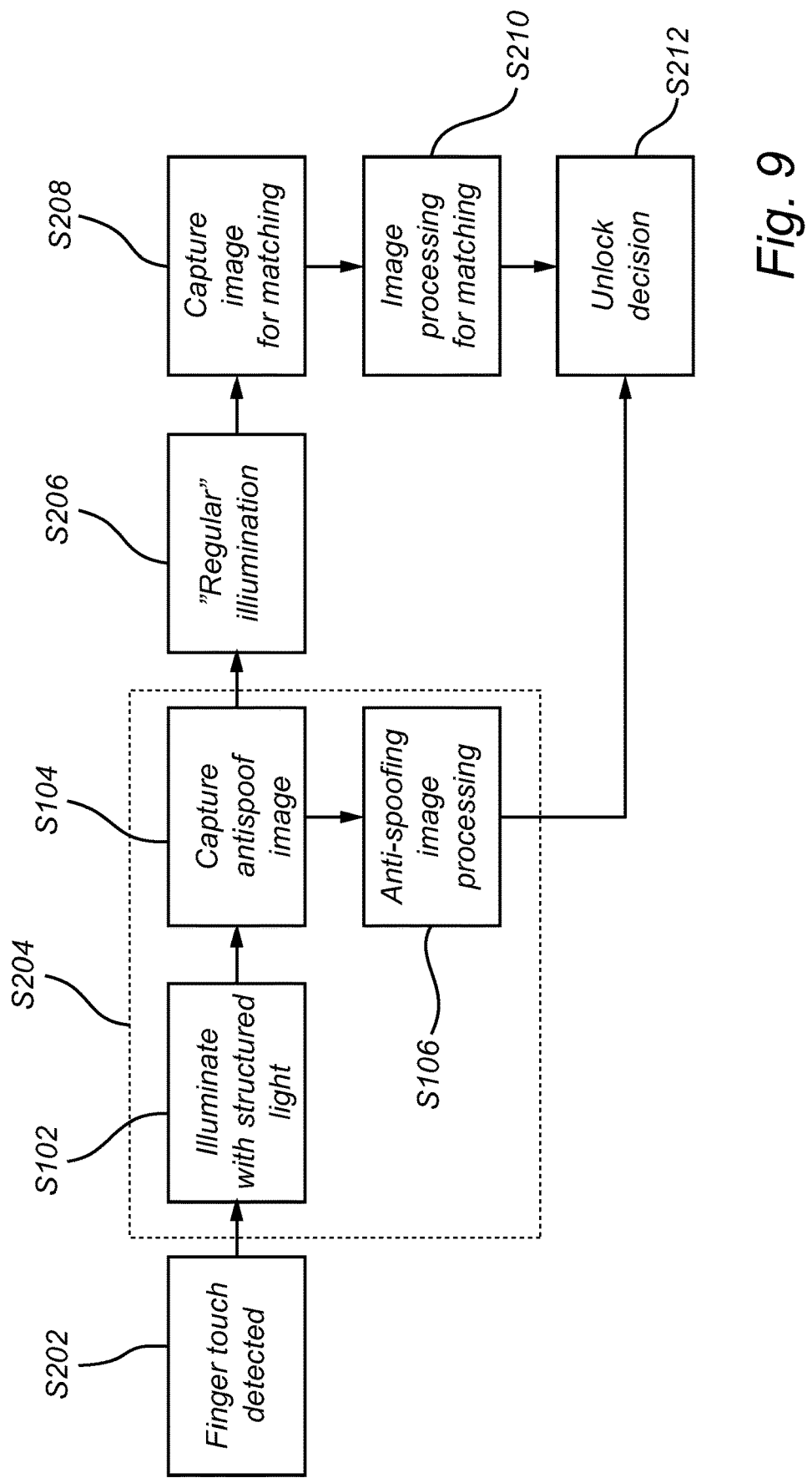
FIG. 9 is a flow-chart of a possible biometric authentication procedure according to embodiments of the invention.

FIG. 9 is a flow-chart of a possible biometric authentication procedure. After a touch is detected by the optical biometric imaging arrangement 100 in step S202, the process enters an anti-spoof pre-processing step S204. Here, the object is illuminated with light comprising portions of different light intensity, such light pattern may be provided in the form of structured light, in step S104. Next, an image is acquired in step S104, the image comprising image portions corresponding to the portions of different light intensity of the light pattern illuminating the object. In step S106, an anti-spoof processing step is performed as part of a biometric authentication. Step S106 comprises to perform the biometric authentication at least partly based on metrics extracted from the image portions.

Further, the process continues to illuminate the object using regular illumination in step S206 for capturing an image for biometric matching purposes in step S208. Regular illumination is the illumination that normally is used for capturing an image used for biometric authentication. Subsequent to an image processing step S210 for biometric matching, an authentication decision is taken in step S212 based on the outcome of step S210 and step S106.

The flow-chart in FIG. 9 illustrates that the method according to the inventive concept may be performed in an anti-spoof pre-processing step S204.

Figure 10:
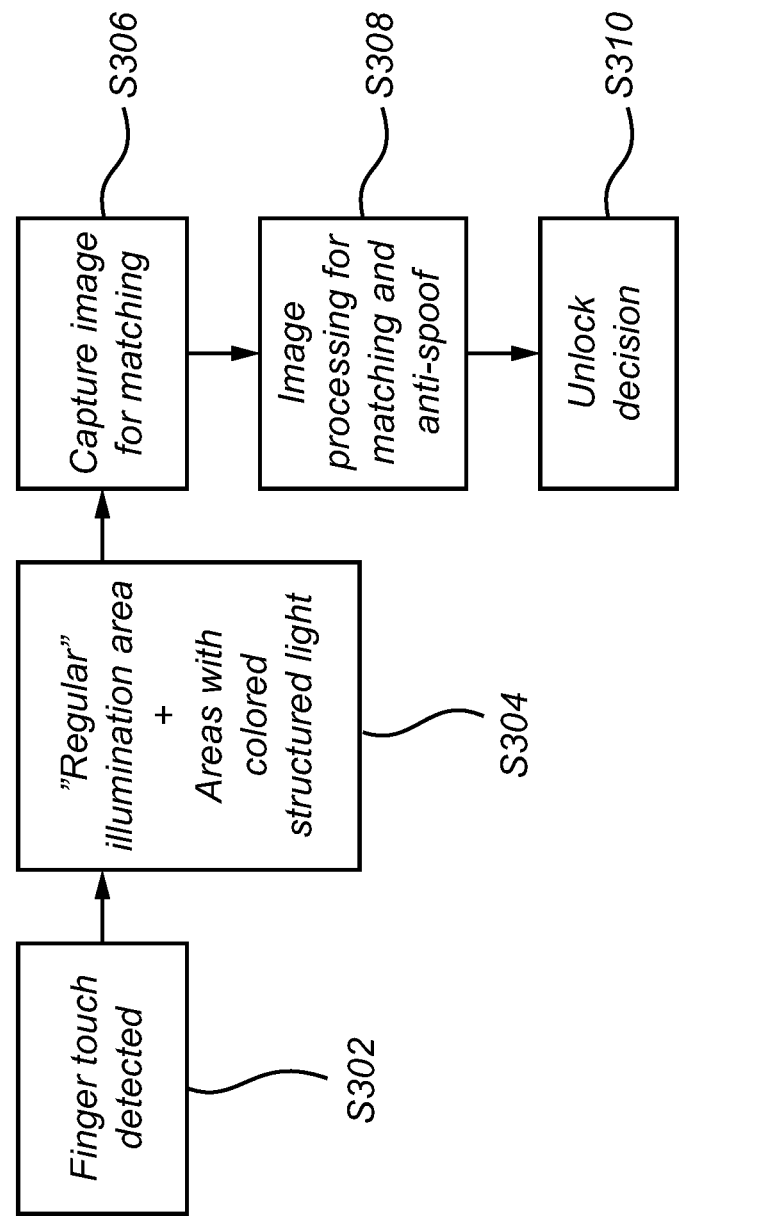
FIG. 10 is a flow-chart of a possible biometric authentication procedure according to embodiments of the invention.

In other possible implementations, the anti-spoof pre-processing step is combined with the steps for biometric matching. FIG. 10 conceptually illustrates steps following such process. After a touch is detected by the optical biometric imaging arrangement 100 in step S302, the object is illuminated with both the structured light, i.e. light with different intensity portions and with illumination used for regular image capturing in step S304. For this, some parts of the controllable light source are used for the structured light and some parts of the controllable light source are used for the regular illumination.

In step S306, an image is captured by the image sensor. The image the image comprising image portions corresponding to the portions of different light intensity of the light pattern illuminating the object. The image further comprises image portions that may be used for biometric matching.

In step S308, the image is processed for both matching purposes and anti-spoof detection based on metrics extracted from the image portions. The outcome of the matching and anti-spoof detection is provided in S310, e.g. whether or not to unlock a device.

Figure 11:
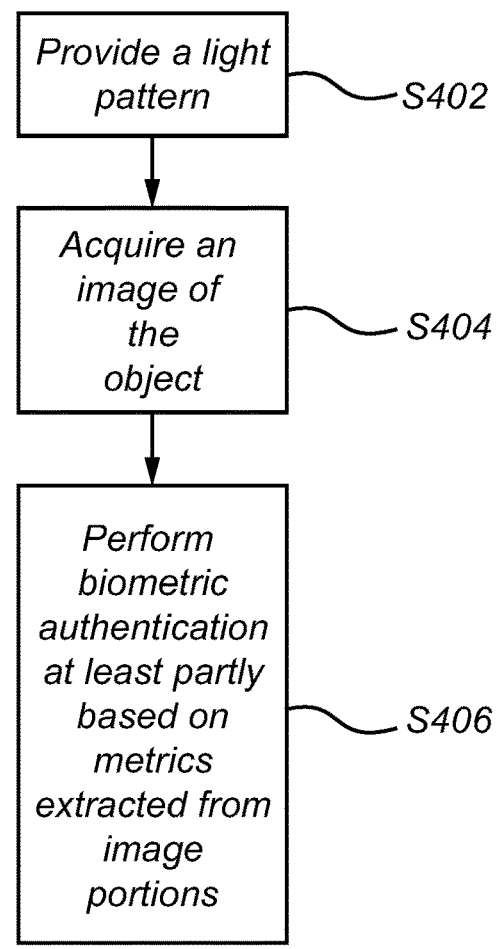
FIG. 11 is a flow-chart of method steps according to embodiments of the invention.

FIG. 11 is a flow chart of method steps according to embodiments of the invention. The method is for biometric authentication using an optical biometric arrangement comprising an image sensor comprising a photodetector pixel array configured to capture an image of an object. The image sensor being arranged under a controllable light source comprising light source units.

The method comprising a step S402 of providing a light pattern comprising portions of different light intensity for illuminating the object.

In step S404, acquiring an image of the object, the image comprising image portions corresponding to the portions of different light intensity of the light pattern illuminating the object.

At least one image portion being captured by pixels in the photodetector pixel array arranged directly under a light source unit being active for image acquisition, and at least one image portion being captured by pixels in the photodetector pixel array arranged under an at least partly in-active illumination area of the controllable light source during image acquisition.

In step S408 performing biometric authentication at least partly based on metrics extracted from the image portions.

Turning again to FIG. 3, for example purposes, the optical biometric imaging arrangement 100 further optionally comprises a transparent substrate 340 arranged to cover the image sensor 304, and an opaque layer 342 covering an upper surface of the transparent substrate 340. The opaque layer 342 further comprises a plurality of separate openings 344 arranged at a distance from each other.

The optical biometric imaging arrangement 100 may comprises an array of microlenses 346 each arranged in a respective opening 344 of the optional opaque layer 342 and in the same plane as the opaque layer 342. Moreover, the microlens 346 has the same size and shape as the opening 344 to prevent any stray light which has not passed through the microlens 344 from reaching the image sensor 304. Other lens structures similar to camera lenses may also be comprised in the optical biometric imaging arrangement.

Each microlens 346 is configured to redirect light through the transparent substrate 340 and onto a subarray of pixels in the photodetector pixel array 306. The subarrays may be arrays of pixels which receive light from only one microlens 346. It should further be noted that the microlenses 346 and display pixels 312, 314 are not drawn to scale. The subarrays of pixels receiving light from the microlenses 346 are preferably non-overlapping with adjacent subarrays receiving light from neighboring microlenses.

The optical biometric imaging arrangement 100 may further comprises additional an intermediate layer between the microlenses and the cover structure 302. The intermediate layer may for example comprise an adhesive layer used to attach the cover structure 302 to the imaging arrangement 100, and an air gap between the cover structure 302 and the microlenses 344. Furthermore, the intermediate layer may also comprise an antireflection coating, an optical filter (e.g. infrared filter) and/or a polarizing filter, which are not illustrated separately herein.

The microlenses are herein illustrated as plano-convex lenses having the flat surface orientated towards the transparent substrate. It is also possible to use other lens configurations and shapes. A plano-convex lens may for example be arranged with the flat surface towards the display panel, and in one embodiment the lens may be attached to a bottom surface of the display panel even though the imaging performance may be degraded compared to the reverse orientation of the microlens. It is also possible to use other types of lenses such as convex lenses. An advantage of using a plano-convex lens is the ease of manufacturing and assembly provided by a lens having a flat surface.

The optical biometric imaging arrangement 100 is illustrated with a set of microlenses. However, this is selected for sake or illustration only and many other possibilities are conceivable and within the scope of the appended claims. For example, in some possible implementations the array of microlenses may be replaced by an array of collimators. In further possible implementations, the light guiding elements are comprised of an array of coded aperture elements. Coded aperture imaging is based on the principle of blocking the incoming light in a known pattern so that a coded shadow is cast upon the image sensor. The properties of the originally emitted light, i.e. the light reaching the coded aperture, can then be mathematically reconstructed from this shadow image.

The general operating principle of the described optical biometric imaging arrangement is that light emitted by pixels in the color controllable light source will be reflected by a finger placed on a sensing surface, and the reflected light may be received by light redirecting elements and subsequently redirected onto a corresponding subarray of pixels in the photodetector pixel array. In case of a subarray, an image of a portion of a finger can be captured for each subarray.

By combining the images from all the light redirecting elements, an image representing the fingerprint can be formed and subsequent biometric verification can be performed.

Figure 12:
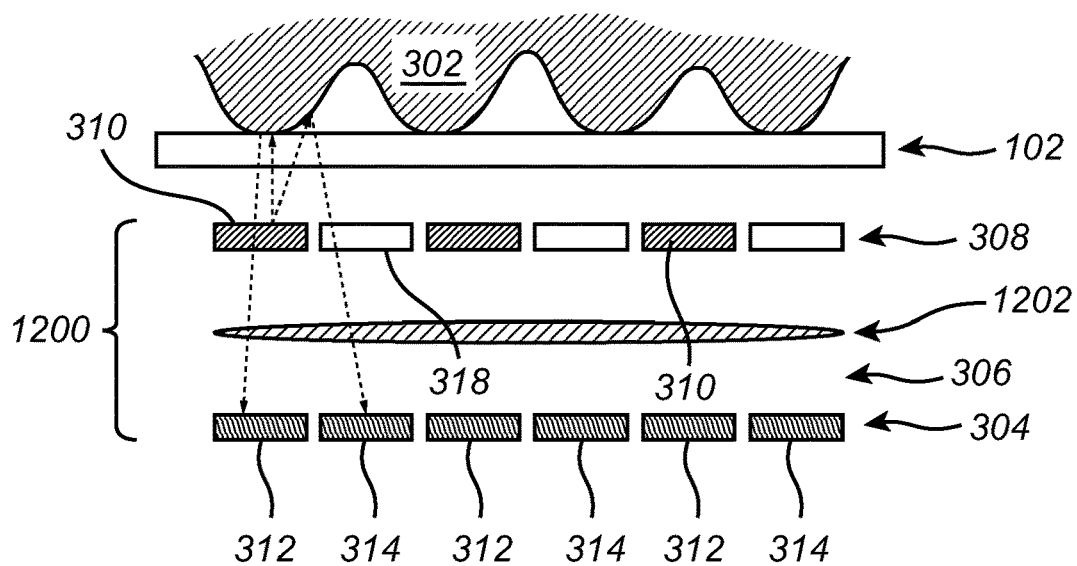
FIG. 12 schematically illustrates an optical biometric imaging arrangement according to embodiments of the invention.

FIG. 12 conceptually illustrates a further possible implementation of an optical biometric imaging arrangement 1200. Here, instead of microlenses, collimators, or coded apertures, at least one camera lens 1202 is used as a light redirecting element, covering all or a subset of pixels 312, 314 of the image sensor 304.

With reference to FIG. 2 and FIG. 3, according to embodiments, there is provided a control unit 202 configured to perform biometric authentication using an optical biometric arrangement 100 comprising an image sensor 304 comprising a photodetector pixel array configured to capture an image of an object 302. The image sensor is arranged under a controllable light source 308 comprising light source units 310.

The control unit 202 is configured to obtain an image of the object 302, the image being acquired while illuminating the object 302 with a light pattern comprising portions of different light intensity, for example using structured light. The obtained image comprises image portions corresponding to the portions of different light intensity of the light pattern illuminating the object 302.

At least one image portion is captured by pixels 312 in the photodetector pixel array arranged directly under a light source 310 being active during image acquisition.

At least one image portion being captured by pixels 314 in the photodetector pixel array arranged under a at least partly in-active illumination area 318 of the controllable light source during image acquisition.

The control unit 202 is configured to perform biometric authentication at least partly based on metrics extracted from the image portions.

The control unit 202 may be configured to control a controllable light source 308 to illuminate the object with the light pattern, and control an image sensor 304 of the optical biometric arrangement to acquire the image of the object. The control unit may thus send a control signal to the controllable light source 308 instructing it to produce illumination.

The size of components illustrated in the drawings are not necessarily to scale. For example, the size of the lights source units and photodetector pixels are primarily selected for clarity in the drawings for illustrating the inventive concept.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the optical biometric imaging arrangement.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Even though the invention has been described with reference to specific exemplifying embodiments thereof, many different alterations, modifications and the like will become apparent for those skilled in the art. Also, it should be noted that parts of the imaging device may be omitted, interchanged or arranged in various ways, the imaging device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for biometric authentication using an optical biometric arrangement comprising an image sensor comprising a photodetector pixel array configured to capture an image of an object, the image sensor being arranged under a controllable light source comprising light source units, the method comprising:
    providing a light pattern comprising portions of different light intensity for illuminating the object;
    acquiring an image of the object, the image comprising image portions corresponding to the portions of different light intensity of the light pattern illuminating the object,
    at least one image portion of a first type being captured by pixels in the photodetector pixel array configured to capture light of a first distinguishable color and arranged directly under a light source unit being active during image acquisition to capture predominantly specular light reflected off the object, and
    at least one image portion of a second type being captured by pixels in the photodetector pixel array configured to capture light of a second distinguishable color and arranged under an at least partly in-active illumination area of the controllable light source during image acquisition to capture predominantly diffuse light reflected off the object, and
    performing biometric authentication including spoof detection based on metrics extracted from the image portions of both the first type and the second type.

2. The method according to claim 1, wherein the light pattern is structured light.

3. The method according to claim 1, wherein the light pattern is provided from spatially separated light source units of the controllable light source.

4. The method according to claim 3, wherein the spatially separated light source units are arranged in a periodic pattern.

5. The method according to claim 1, wherein the light pattern includes light of at least two distinguishable colors.

6. The method according to claim 5, wherein a first set of light source units provides light of a first distinguishable color and a second set of light source units provides light of a second distinguishable color for illuminating the object.

7. The method according to claim 5, wherein color information in the image portions is included in the metrics.

8. The method according to claim 5, wherein biometric authentication is at least partly based on metrics extracted from the image portions for each of the at least two distinguishable colors.

9. The method according to claim 1, wherein any one pixel configured to capture light of a first distinguishable color or any one pixel configured to capture light of the second distinguishable color is arranged directly under a light source unit being active for image acquisition.

10. The method according to claim 1, wherein any one pixel configured to capture light of a first distinguishable color or any one pixel of configured to capture light of the second distinguishable color is arranged under an at least partly in-active illumination area of the controllable light source during image acquisition.

11. The method according to claim 1, comprising illuminating the object with broad band illumination.

12. The method according to claim 1, wherein the metrics are extracted based on histogram analysis of image portions.

13. The method according to claim 1, the photodetector pixel array comprising pixels arranged to capture predominantly specular light reflected off the object and pixels arranged to capture predominantly diffuse light reflected off the object.

14. The method according to claim 1, comprising pre-processing the acquired image for forming metrics based on properties in the image portions.

15. The method according to claim 1, wherein the light pattern is a dot pattern, wherein a first group of image portions are acquired by pixels direct under the dots, and a second group of image portions are acquired by pixels under and between the dots.

16. The method according to claim 1, wherein the biometric authentication is based on processing the metrics using a model.

17. The method according to claim 1, wherein the biometric authentication is based on processing the metrics using a machine learning algorithm.

18. An optical biometric imaging arrangement configured to capture an image of an object, the biometric imaging arrangement comprising:
- an image sensor comprising a photodetector pixel array, the image sensor being arranged under a controllable light source comprising light source units, wherein the photodetector pixel array comprises a first set of pixels to acquire a first type of image portion, pixels of the first set of pixels being configured to capture light of a first distinguishable color and being arranged directly under a light source unit of the controllable light source that is active during image acquisition to capture predominantly specular light reflected off the object, and a second set of pixels to acquire a second type of image portion, pixels of the second set of pixels being configured to capture light of a second distinguishable color and being arranged directly under a portion of the controllable light source that is at least partly in-active during image acquisition to capture predominantly diffuse light reflected off the object,
- the optical biometric imaging arrangement being configured to:
  - illuminate the object with a light pattern comprising portions of different light intensity using the controllable light source;
  - acquire an image of the object, the image comprising image portions of the first type and of the second type corresponding to the portions of different light intensity of the light pattern illuminating the object,
  - perform biometric authentication including spoof detection based on metrics extracted from the image portions of both the first type and the second type.

19. An electronic device comprising:
the optical biometric imaging arrangement according to claim 18, and
processing circuitry configured to:
receive a signal from the optical biometric imaging arrangement indicative of a fingerprint of a finger touching the transparent display panel,
perform a fingerprint authentication procedure based on the detected fingerprint.

20. A control unit configured to perform biometric authentication using an optical biometric arrangement comprising an image sensor comprising a photodetector pixel array configured to capture an image of an object, the image sensor being arranged under a controllable light source comprising light source units, the control unit being configured to:
- obtain an image of the object, the image being acquired while illuminating the object with a light pattern comprising portions of different light intensity, whereby the obtained image comprises image portions corresponding to the portions of different light intensity of the light pattern illuminating the object,
- at least one image portion of a first type being captured by pixels in the photodetector pixel array configured to capture light of a first distinguishable color and arranged directly under a light source unit being active during image acquisition to capture predominantly specular light reflected off the object, and
- at least one image portion of a second type being captured by pixels in the photodetector pixel array configured to capture light of a second distinguishable color and arranged under an at least partly in-active illumination area of the controllable light source during image acquisition to capture predominantly diffuse light reflected off the object, and
- perform biometric authentication including spoof detection based on metrics extracted from the image portions of both the first type and the second type.

* * * * *